Dec. 5, 1944.   B. F. GRAVELY   2,364,208
CULTIVATOR BLADE
Filed July 14, 1943   2 Sheets-Sheet 1
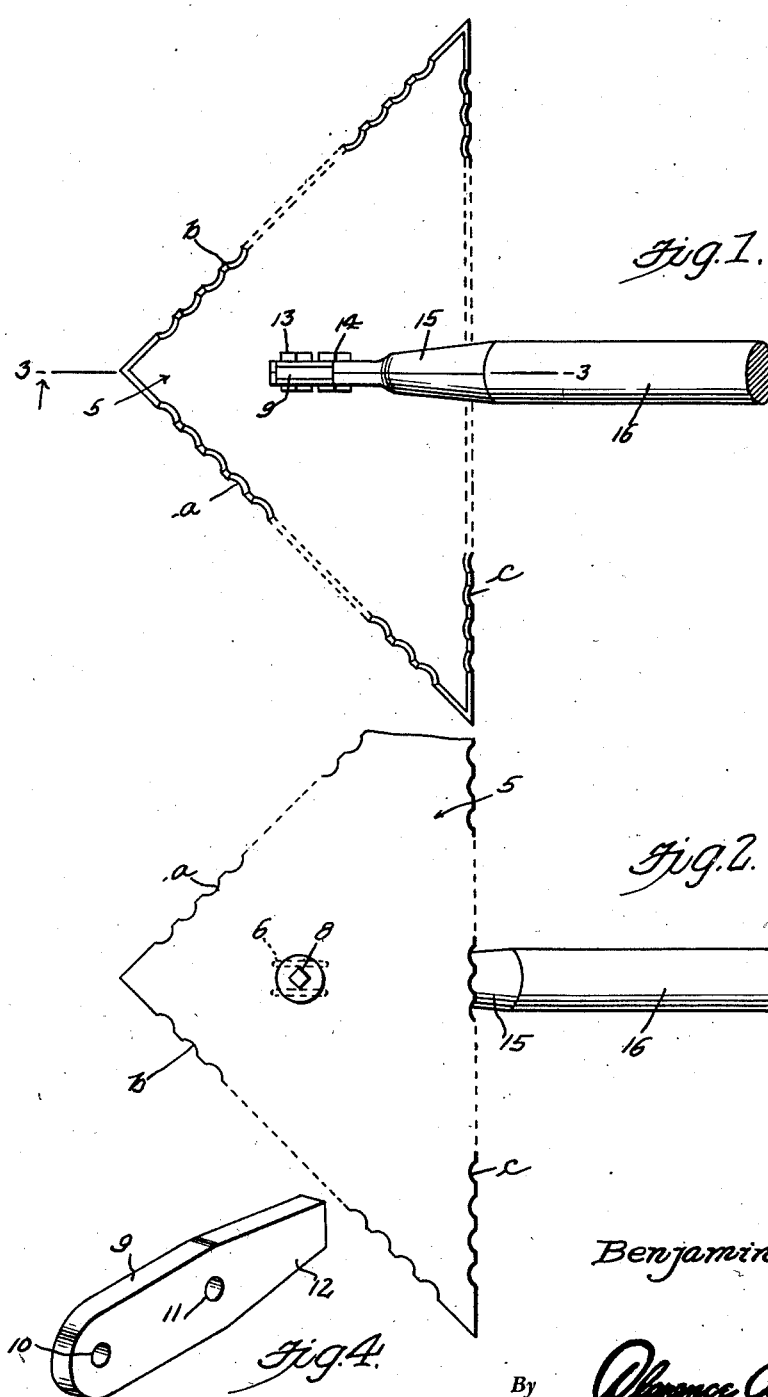
Inventor
Benjamin F. Gravely
By Clarence A. O'Brien
and Harvey B. Jacobson
Attorneys Dec. 5, 1944.　　　B. F. GRAVELY　　　2,364,208
CULTIVATOR BLADE
Filed July 14, 1943　　　2 Sheets-Sheet 2
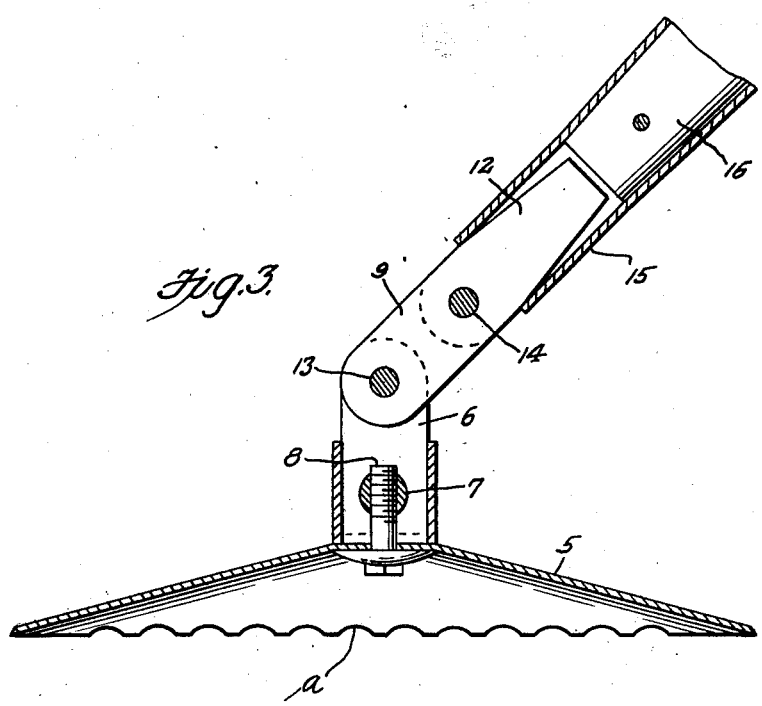
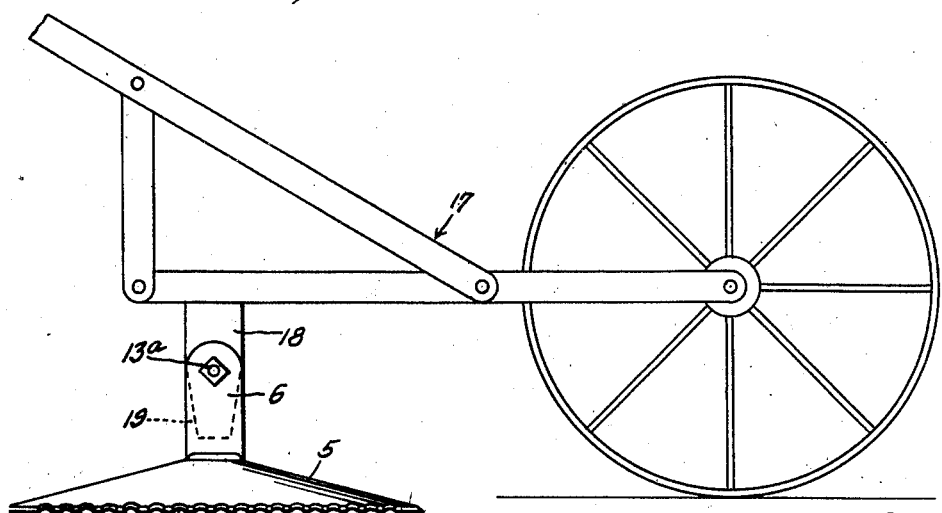
Inventor
Benjamin F. Gravely
By Clarence A. O'Brien
and Harvey B. Jacobson
Attorneys Patented Dec. 5, 1944

2,364,208

UNITED STATES PATENT OFFICE 2,364,208

CULTIVATOR BLADE

Benjamin F. Gravely, Charleston, W. Va.

Application July 14, 1943, Serial No. 494,713

1 Claim. (Cl. 97—68)

This invention relates to new and useful improvements in blades for cultivating growing crops, the principal object being to provide a blade which can be used on a hand implement in the nature of a hoe, or on a wheeled vehicle for heavy cultivation.

Another important object of the invention is to provide a cultivating blade which will have a sub-soil action and which due to the peculiar shape of its cutting edge will not become easily dulled by striking large rocks and other obstacles.

Other objects and advantages of the invention will become apparent to the reader of the following description.

In the drawings:

Figure 1 represents a fragmentary top plan view showing the specific shape of the blade.

Figure 2 is a fragmentary bottom plan view showing the structure disclosed in Figure 1.

Figure 3 is a fragmentary vertical sectional view taken on the line 3—3 of Figure 1.

Figure 4 is a perspective view of the connector element.

Figure 5 is a fragmentary side elevational view showing the blade employed on a cultivating machine.

Referring to the drawings wherein like numerals designate like parts, it can be seen that numeral 5 generally refers to the blade and as can be seen in Figures 1 and 2, this blade is of triangular shape, having three cutting edges a, b and c, each of which is waved or undulated.

Furthermore, the blade is of concavo-convex shape, the concaved side being disposed downwardly. This will have the effect of promoting the blade to a sub-soil level when being slid along the ground, thus cutting off weeds and undesirable growths at their roots.

The high point of the blade 5 has a pair of ears 6, 6 between which as shown in Figure 3 is a member 7 having a threaded opening therein for receiving a bolt 8 which passes upwardly through an opening in the blade 5. Numeral 9 denotes a connector having openings 10, 11 therein and one end is tapered as at 12. A bolt 13 is disposed through the upper ends of the ears 6 and through the openings 10 of the connector 9 while a bolt 14 passes through the opening 11 of the connector 9 and through apertured ears on the adjacent end of a ferrule 15 which is suitably secured to an elongated handle 16.

In the event the blade 5 is used in conjunction with a wheeled vehicle such as is generally referred to by numeral 17 (see Figure 5), the frame of the vehicle 17 may have a depending stump 18 tapered at its lower end as at 19 for disposition into the space between the ears 6 and a bolt 13a corresponding to the bolt 13 may be disposed through the ears 6 and through an opening in the stump 18 for definitely securing the blade to the wheeled vehicle.

It can be seen, that due to the fact that the edges of the blade are undulated, the striking of the blade against large obstacles, such as large rocks will not affect the cutting edges of the blade and small pebbles and the like will have more of a tendency to sharpen or maintain sharp these cutting edges rather than dull the same inasmuch as they will readily slip over the edges of the blade.

Obviously, this blade can be used as a hoe by using the blade in a vertical position or as a row opener or row coverer.

While the foregoing specification sets forth the invention in specific terms, it is to be understood that numerous changes in the shape, size and materials may be restorted to without departing from the spirit and scope of the invention as claimed hereinafter.

Having described the invention, what is claimed as new is:

In a sub-soil hoe, a blade comprising a horizontal triangular plate concave on its under surface and convex on its upper surface, said plate having two similar relatively short edges and a single relatively longer edge, all of said edges being of straight formation and each being provided with a series of uniformly spaced arcuate indentations connected by very short straight edge portions, said indentations and straight edge portions being beveled on the upper side to a cutting edge, the edge portions of the plate at the corners thereof being straight and beveled on the upper side to provide V-shaped cutting edges, and means to attach a manipulating member to the top of the plate centrally of the latter.

BENJAMIN F. GRAVELY.